(12) United States Patent
Olczak

(10) Patent No.: US 7,356,904 B2
(45) Date of Patent: Apr. 15, 2008

(54) HIGH SPEED LINEAR MOTION MECHANISM

(75) Inventor: Eugene George Olczak, Pittsford, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/702,118

(22) Filed: Feb. 5, 2007

(65) Prior Publication Data

US 2007/0130749 A1 Jun. 14, 2007

Related U.S. Application Data

(62) Division of application No. 11/017,467, filed on Dec. 20, 2004, now Pat. No. 7,219,410.

(51) Int. Cl.
*H01L 41/08* (2006.01)
*B23P 23/00* (2006.01)

(52) U.S. Cl. .................. 29/560; 301/328; 82/1.5; 29/33 P

(58) Field of Classification Search .............. 28/560, 28/33 P; 82/1.2, 1.4, 1.5, 133, 158, 173; 408/156, 154; 310/328; 409/136
See application file for complete search history.

(56) References Cited

U.S. PATENT DOCUMENTS

| | | | |
|---|---|---|---|
| 4,219,755 A | 8/1980 | Uchiyama | |
| 4,573,833 A | 3/1986 | Kondo | |
| 4,932,131 A | 6/1990 | McMurtry | |
| 5,133,599 A | 7/1992 | Sommargren | |
| 5,668,432 A | 9/1997 | Tominaga et al. | |
| 5,771,328 A | 6/1998 | Wortman et al. | |
| 6,040,653 A | 3/2000 | O'Neil | |
| 6,052,251 A | 4/2000 | Mohajerani et al. | |
| 6,062,778 A | 5/2000 | Szuba et al. | |
| 6,252,192 B1 | 6/2001 | Lozon et al. | |
| 6,354,709 B1 | 3/2002 | Campbell et al. | |
| 2002/0005679 A1 | 1/2002 | Elings et al. | |
| 2003/0035231 A1 | 2/2003 | Epstein et al. | |
| 2003/0106372 A1 | 6/2003 | Adams et al. | |
| 2004/0183403 A1 | 9/2004 | Uchiyama et al. | |

FOREIGN PATENT DOCUMENTS

DE    94 22 389    6/2001

*Primary Examiner*—Dana Ross
(74) *Attorney, Agent, or Firm*—Foley & Lardner LLP

(57) ABSTRACT

A motion mechanism is described. In one embodiment, the motion mechanism includes a base portion, a flexure portion, and a transducer. The flexure portion includes a payload support portion configured to support a payload, a first plurality of elongated portions extending substantially in a first direction and contacting the payload support portion, wherein the flexure portion contacts the base portion. The transducer is arranged to provide a force to the payload support portion in a second direction when actuated, the second direction substantially orthogonal to the first direction. Other embodiments of the motion mechanism are also described.

18 Claims, 7 Drawing Sheets

HIGH SPEED LINEAR MOTION MECHANISM

This application is a Divisional Application of application Ser. No. 11/017,467, filed Dec. 20, 2004 now U.S. Pat. No. 7,219,410.

FIELD OF THE INVENTION

This invention is related generally to a motion mechanism for a machine tool system, and a machine tool system incorporating such a mechanism.

BACKGROUND OF THE INVENTION

Machine tool systems that allow for the machining of a surfaces are known. In particular, machine tool systems which translate diamond cutting tools relative to a surface to cut and machine the surface are known. In these systems motion is provided to the cutting tool, or the surface to be machined or both.

SUMMARY OF THE INVENTION

In accordance with one embodiment of the present invention, there is provided a motion mechanism. The motion mechanism comprises: a payload support portion configured to support a payload; a ground portion; a first side portion connected to the payload support portion at a first contact point and connected to the ground portion at a second contact point; a second side portion connected to the payload support portion at a third contact point and connected to the ground portion at a fourth contact point; a first transducer arranged to provide a force to the first side portion in a first linear direction when actuated so that the first side portion provides a force to the payload support portion at the first contact point in a second direction substantially orthogonal to the first direction; and a second transducer arranged to provide a force to the second side portion in a third linear direction when actuated so that the second side portion provides a force to the payload support portion at the third contact point in a fourth direction substantially orthogonal to the third direction.

In accordance with another embodiment of the present invention, there is provided a motion mechanism. The motion mechanism comprises: a payload support portion configured to support a payload; a ground portion; a first side portion connected to the payload support portion at a first contact point and connected to the ground portion at a second contact point; a second side portion connected to the payload support portion at a third contact point and connected to the ground portion at a fourth contact point; and a first transducer arranged to provide a force to the first side portion in a first linear direction when actuated so that the first side portion provides a force to the payload support portion at the first contact point in a second direction substantially orthogonal to the first direction.

In accordance with another embodiment of the present invention, there is provided a motion mechanism. The motion mechanism comprises: a payload support portion configured to support a payload; a ground portion; a first side portion connected to the payload support portion at a first contact point and connected to the ground portion at a second contact point; a second side portion connected to the payload support portion at a third contact point and connected to the ground portion at a fourth contact point; a first transducer arranged to provide a force to the first side portion in a first direction when actuated so that the first side portion provides a force to the payload at the first contact point in a second direction substantially orthogonal to the first direction; and a spring arranged to provide a bias force to the second side portion in a third direction so that the second side portion provides a force to the payload at the third contact point in a fourth direction substantially orthogonal to the third direction.

In accordance with another embodiment of the present invention, there is provided a motion control system. The motion control system comprises: a workpiece support configured to support a workpiece; a motion mechanism comprising: a payload support portion configured to support a payload; a ground portion; a first side portion connected to the payload support portion at a first contact point and connected to the ground portion at a second contact point; a second side portion connected to the payload support portion at a third contact point and connected to the ground portion at a fourth contact point; a first transducer arranged to provide a force to the first side portion in a first linear direction when actuated so that the first side portion provides a force to the payload support portion at the first contact point in a second direction substantially orthogonal to the first direction; and a second transducer arranged to provide a force to the second side portion in a third linear direction when actuated so that the second side portion provides a force to the payload support portion at the third contact point in a fourth direction substantially orthogonal to the third direction; and a controller unit configured to control the transducers to control the motion of the cutting tool to cut the workpiece.

In accordance with another embodiment of the present invention, there is provided a motion mechanism. The motion mechanism comprises: a base portion; a flexure portion comprising: a payload support portion configured to support a payload; a first plurality of elongated portions extending substantially in a first direction and contacting the payload support portion; and wherein the flexure portion contacts the base portion; and a transducer arranged to provide a force to the payload support portion in a second direction when actuated, the second direction substantially orthogonal to the first direction.

In accordance with another embodiment of the present invention, there is provided a motion control system. The motion control system comprises: a workpiece support configured to support a workpiece; a motion mechanism comprising: a base portion; a flexure portion comprising: a payload support portion configured to support a payload; a first plurality of elongated portions extending substantially in a first direction and contacting the payload support portion, wherein the flexure portion contacts the base portion; and a transducer arranged to provide a force to the payload support portion in a second direction when actuated, the second direction substantially orthogonal to the first direction; and a controller unit configured to control the transducers to control the motion of the cutting tool to cut the workpiece.

DETAILED DESCRIPTION OF THE PREFERRED EMBODIMENTS

Reference will now be made in detail to presently preferred embodiments of the present invention. Wherever possible, the same reference numbers will be used throughout the drawings to refer to the same or like parts.

In a preferred embodiment of the invention, a simple four bar motion mechanism is provided to constrain the motion of a payload. Preferably, opposing bars of the mechanism are of equal length so that the resultant motion is parallel for small displacements. The bars adjacent to the payload may be connected to motion transducers in such a way that a mechanical advantage can be applied between the transducer and the payload. In one embodiment two transducers may be used, and may be driven in opposite polarity. Alternatively, the mechanism may include a single transducer with a spring acting as an opposing force.

The linear motion provided by the transducer or transducers beneficially allows the motion mechanism to be formed to be compact in size. In turn, the compact size enables the motion mechanism to be operated with a relatively high bandwidth.

Figure 1:
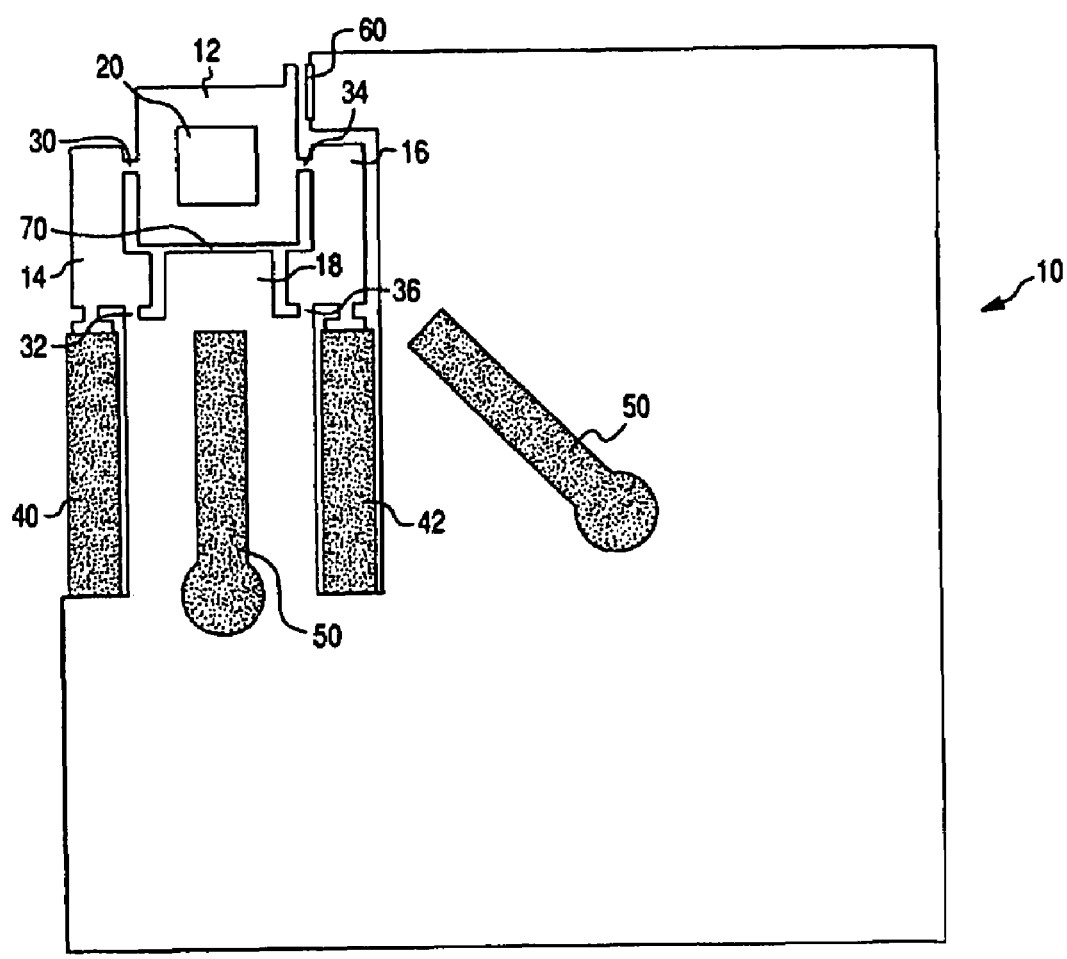
FIG. 1 is a top view of a motion mechanism according to a preferred embodiment of the invention.
Figure 2:
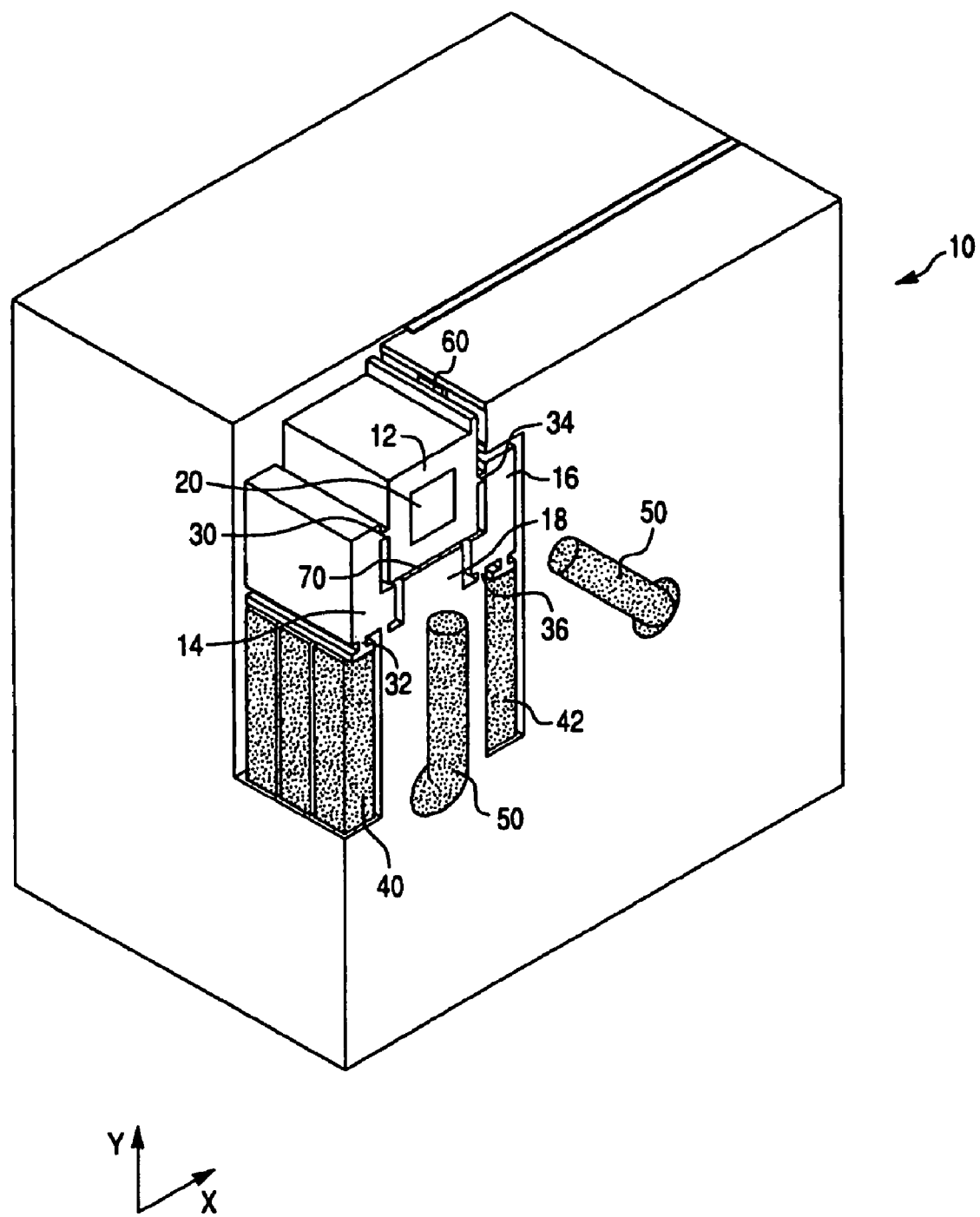
FIG. 2 is a perspective view of the motion mechanism of FIG. 1.

FIGS. 1 and 2 illustrate a motion mechanism 10 according to a preferred embodiment of invention. The motion mechanism 10 includes a payload support portion 12, a first side portion 14, a second side portion 16, and a grounded portion 18. The motion mechanism 10 provides motion to the payload support portion 12 in the plane of the paper of FIG. 1 (the x-y plane), and specifically provides horizontal motion (along the x-axis) to the payload support portion 12. In this embodiment the bars of the four bar mechanism include the first and second side portions 14 and 16, and the grounded portion 18, and the payload support portion 12.

The payload support portion 12 is configured to support a payload 20, such as a cutting tool or laser head, for example. If the payload 20 is a cutting tool, the cutting tool may be a diamond cutting tool, for example. If the payload 20 is a laser head, the laser head may include an end of an optical fiber and corresponding optics, where an opposing end of the optical fiber is optically coupled to a laser, for example.

The first side portion 14 is connected to the payload portion 12 at a first contact point 30 and connected to the ground portion 18 at a second contact point 32. The second side portion 16 is connected to the payload portion 12 at a third contact point 34 and connected to the ground portion 18 at a fourth contact point 36.

The motion mechanism 10 also includes a first transducer 40 and a second transducer 42 to provide motion to the payload support portion 12 and thus to the payload 20. The first transducer 40 is arranged to provide a force to the first side portion 14 in a first linear direction when actuated so that the first side portion 14 provides a force to the payload support portion 12 at the first contact point 30 in a second direction substantially orthogonal to the first direction. For example, in the configuration shown in FIGS. 1 and 2, if the first linear direction is the +y direction, the second direction is the +x direction. Conversely, if the first linear direction is the −y direction, the second direction is the −x direction.

Similarly, the second transducer 42 is arranged to provide a force to the second side portion 16 in a third linear direction when actuated so that the second side portion 16 provides a force to the payload support portion 12 at the third contact point 34 in a fourth direction substantially orthogonal to the third direction. For example, in the configuration shown in FIGS. 1 and 2, if the third linear direction is the +y direction, the fourth direction is the −x direction. Conversely, if the third linear direction is the −y direction, the fourth direction is the +x direction.

In this embodiment, the transducers 40 and 42 are arranged in a "push-pull" configuration, i.e., if the first linear direction and the third linear direction are opposite to one another, the second direction is substantially the same as the fourth direction. For example, if the first linear direction is the +y direction and the third linear direction is the −y direction, both the second direction and the fourth direction are the +x direction. Thus, in this case the first transducer 40 causes the first side portion 14 to "push" on the payload support portion 12, while the second transducer 42 causes the second side portion 16 to "pull" on the payload support portion 12. The transducers 40 and 42 are driven with opposite polarity, i.e., one transducer is driven to expand, while the other to contract, to provide motion to the payload support portion 12 in the same direction.

The contact portions 30, 32, 34 and 36 preferably comprise a rigid or semirigid material to transfer the forces generated by the transducer. The contact portions 30, 32, 34 and 36 are also preferably relatively narrow in the plane of the motion (the x-y plane in FIG. 1), for example, they may have a cross-section in the plane of the motion of between 0.1 mm ×0.1 mm and 3 mm ×3 mm, for example. The relatively narrow contact portions allow the contact portions to sufficiently flex. For example, when the transducer 40 provides a force in the +y or −y direction, the contact portion 32 between the ground portion 18 and the first side portion 14 should be able to flex to allow the first side portion 14 to rotate about the contact portion 32. Likewise, when the transducer 42 provides a force in the +y or −y direction, the contact portion 36 between the ground portion 18 and the second side portion 16 should be able to flex to allow the second side portion 16 to rotate about the contact portion 36.

In this embodiment, both the first and second side portions 14 and 16 are substantially L-shaped with the bottom portions of the Ls pointing toward each other. The present invention is not limited to first and second side portions having a particular shape, and may be shaped other than substantially L-shaped.

The contact points 30, 32, 34 and 36, the payload support portion 12, the first and second side portions 14 and 16 and the ground portion 18 may all be formed from the same block of material. In this way the contact points 30, 32, 34 and 36, the payload support portion 12, the first and second side portions 14 and 16, and the ground portion 18 may all be integral. For example, the contact points 30, 32, 34 and 36, the payload support portion 12, the first and second side portions 14 and 16 and the ground portion 18 may all be formed from a titanium alloy, aluminum alloy or steel block. The block may be machined by wire electrical discharge machining (EDM) or conventional milling, for example, to form the contact points 30, 32, 34 and 36, the payload support portion 12, the first and second side portions 14 and 16 and the ground portion 18 in an integral fashion.

The ground portion 18 may comprise a ground block, and the ground block may include one or more spray nozzles 50 thereon to provide a spray towards the payload support portion 12. For example, if the payload 20 is a cutting tool, the spray nozzles 50 may provide a spray of air or other gas to blow away chips or other debris formed when the cutting tool cuts into a workpiece.

The transducers 40 and 42 may be piezoelectric transducers, for example. For example, the transducers may be formed of piezoelectric crystalline stacks, and may comprise PZT material, for example.

The motion mechanism 10 may also include a position probe 60 to detect the position of the payload support portion 12. The position probe 60 provides feedback when the motion mechanism 10 is controlled to position the payload support portion 12 and its payload 20. The position probe 60 may be at least one of a capacitance gauge, a laser range finder, or an interferometer, for example.

The motion mechanism 10 may also include a constrained layer 70 that acts to provide viscoelastic damping to the motion of the payload support portion 12 and thus the payload. This damping reduces overshoot and ringing in the actual position of the payload 20 relative to the commanded position of the payload 20 when the payload 20 is driven. The constrained layer 70 may be positioned between the ground portion 18 and the payload support portion 12. The constrained layer may comprise a viscoelastic material such as polypropylene, for example.

The linear motion provided by the transducers 40 and 42 allows the motion mechanism to be formed to be compact in size, and thus may be operated with a relatively high bandwidth. The resonant frequency of the motion of the payload support portion 12 may be greater than about 4 kHz, for example.

Figure 3:
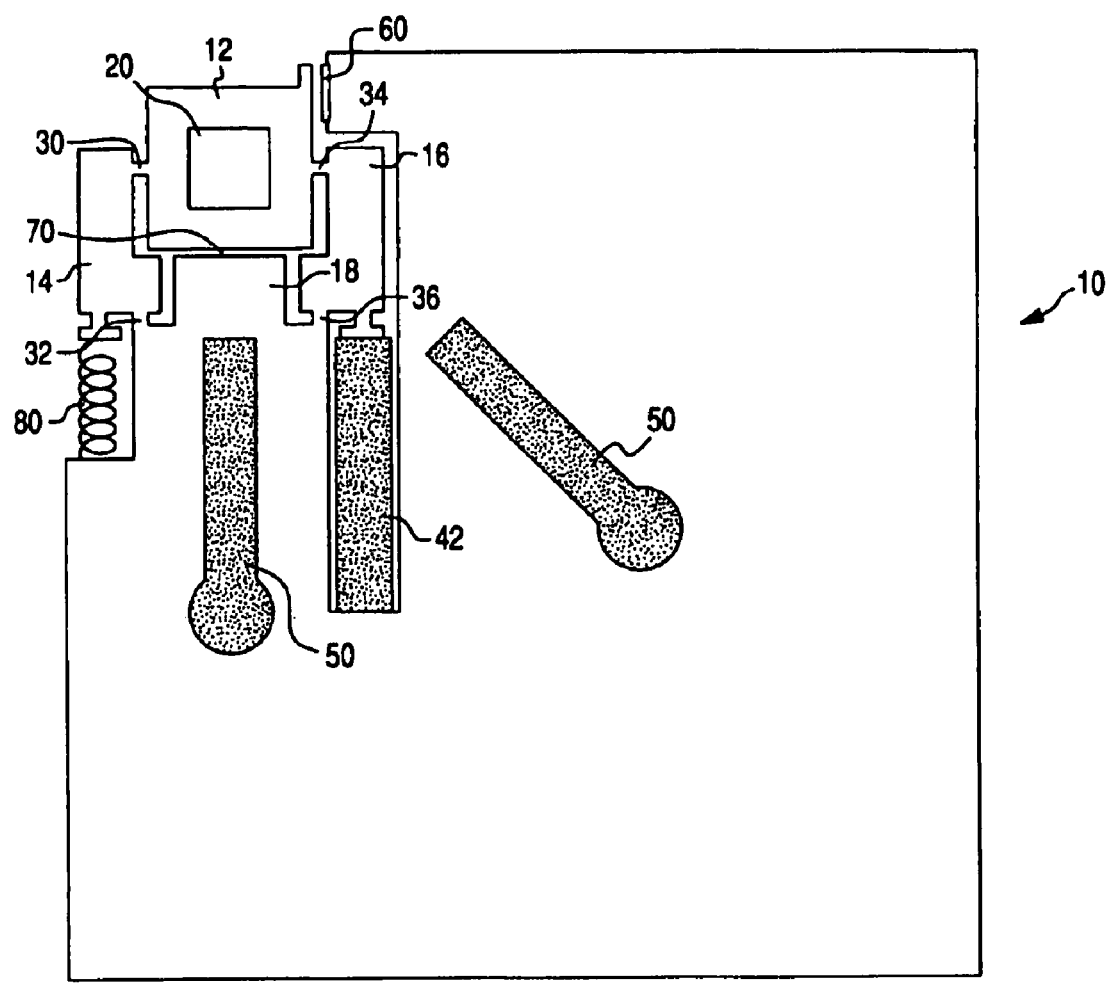
FIG. 3 is a top view of a motion mechanism according to another preferred embodiment of the invention.

FIG. 3 illustrates another preferred embodiment of the invention. In the embodiment illustrated in FIG. 3, one of the transducers is replaced with a spring 80, but is otherwise the same. The same reference numerals denote the same components in FIGS. 1, 2 and 3. The spring 80 provides a biasing and restoring force to the first side portion 14 in the first direction so that the first side portion 14 provides a force to the payload support portion 12 at the second contact point 32. The spring 80 may be of a bulk material that provides a torsional stiffness to act as the spring.

Figure 5:
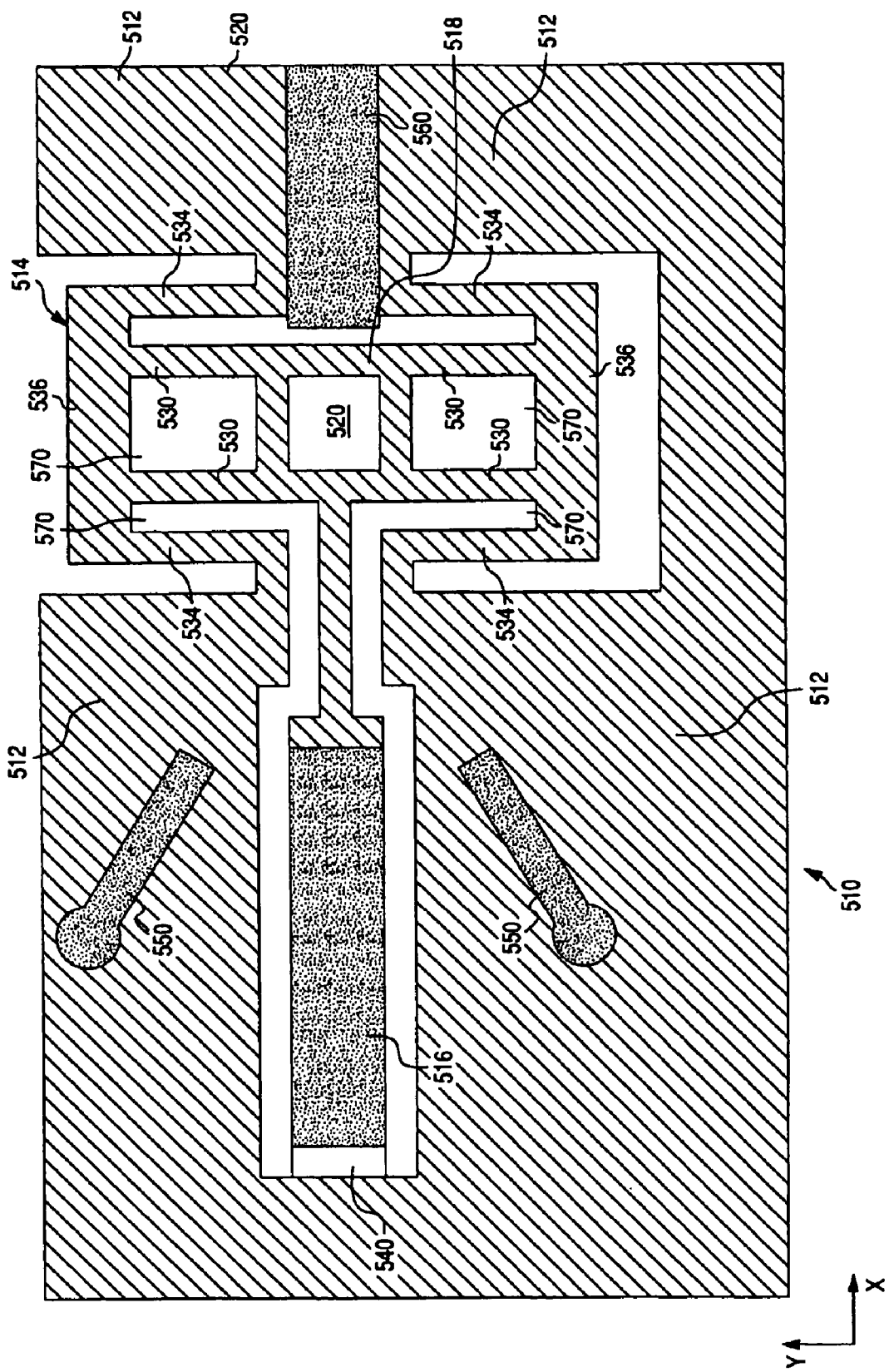
FIG. 5 is a schematic view of a motion mechanism according to another preferred embodiment of the invention.

FIG. 5 illustrates another preferred embodiment of the invention where the motion control system is of a flexure design. The motion mechanism 510 includes a base portion 512, a flexure portion 514 and a transducer 516. The motion mechanism 510 provides motion to a payload support portion 518, which is part of the flexure portion 514, in the plane of the paper of FIG. 5 (the x-y plane), and specifically provides horizontal motion (along the x-axis) to the payload support portion 518. The spring 80 may be eliminated if any or all of contact points 30, 32, 34 and 36 are made so that their combined torsional stiffness acts as the spring. In this way the spring may be formed in the bulk material of the motion mechanism.

The transducer 516 may be a piezoelectric transducer, for example. For example, the transducers 516 may be formed of piezoelectric crystalline stacks, and may comprise PZT material, for example.

In a similar fashion to the embodiments as illustrated in FIGS. 1 and 2, in this embodiment, the payload support portion 518 is configured to support a payload 520, such as a cutting tool or laser head, for example. If the payload 520 is a cutting tool, the cutting tool may be a diamond cutting tool, for example. If the payload 520 is a laser head, the laser head may include an end of an optical fiber and corresponding optics, where an opposing end of the optical fiber is optically coupled to a laser, for example.

The flexure portion 514 includes a first plurality of elongated portions 530. One end of each of the first plurality of elongated portions 530 contacts the payload support portion 518. Each of the first plurality of elongated portions 530 extends substantially in a first direction, for example, in the y-direction as illustrated in FIG. 5.

The flexure portion 514 may also include a second plurality of elongated portions 534 and bar portions 536. The second plurality of elongated portions 534 extend substantially in the same direction as the first plurality of elongated portions 530, for example, they both extend substantially in the y direction as shown in FIG. 5.

Each of the bar portions 536 functions to connect respective elongated portions of the first plurality of elongated portions 530 with respective elongated portions of the second plurality of elongated portions 534. For example, as shown in FIG. 5, two of the first plurality of elongated portions 530 at the top are connected to two of the second plurality of elongated portions 534 at the top via a top one of the bar portions 536, and correspondingly two of the first plurality of elongated portions 530 at the bottom are connected to two of the second plurality of elongated portions 534 at the bottom via a bottom one of the bar portions 536.

Each of the elongated portions of the second plurality of elongated portions 534 has a first end and an opposing end opposite to the first end. The first end contacts the base portion 512 at a respective contact point, while the opposing end contacts one of the bar portions 536.

Each of the elongated portions of the first plurality of elongated portions 530 has one end contacting a respective bar portion 536, and an opposing end contacting the payload support portion 518.

The transducer 516 applies a force to the payload support portion 518 in a second direction substantially orthogonal to the first direction (substantially the direction of the elongated support portions), for example, in the x-direction as illustrated in FIG. 5. Applying the force substantially orthogonal to the direction of the elongated portions 530 allows the elongated portions 530 to flex at their respective points of contact with the bar portion 536 and payload support portion 518, and allows the elongated portions 534 to flex at their respective points of contact with the bar portion 536 and base portion 512.

Figure 6:
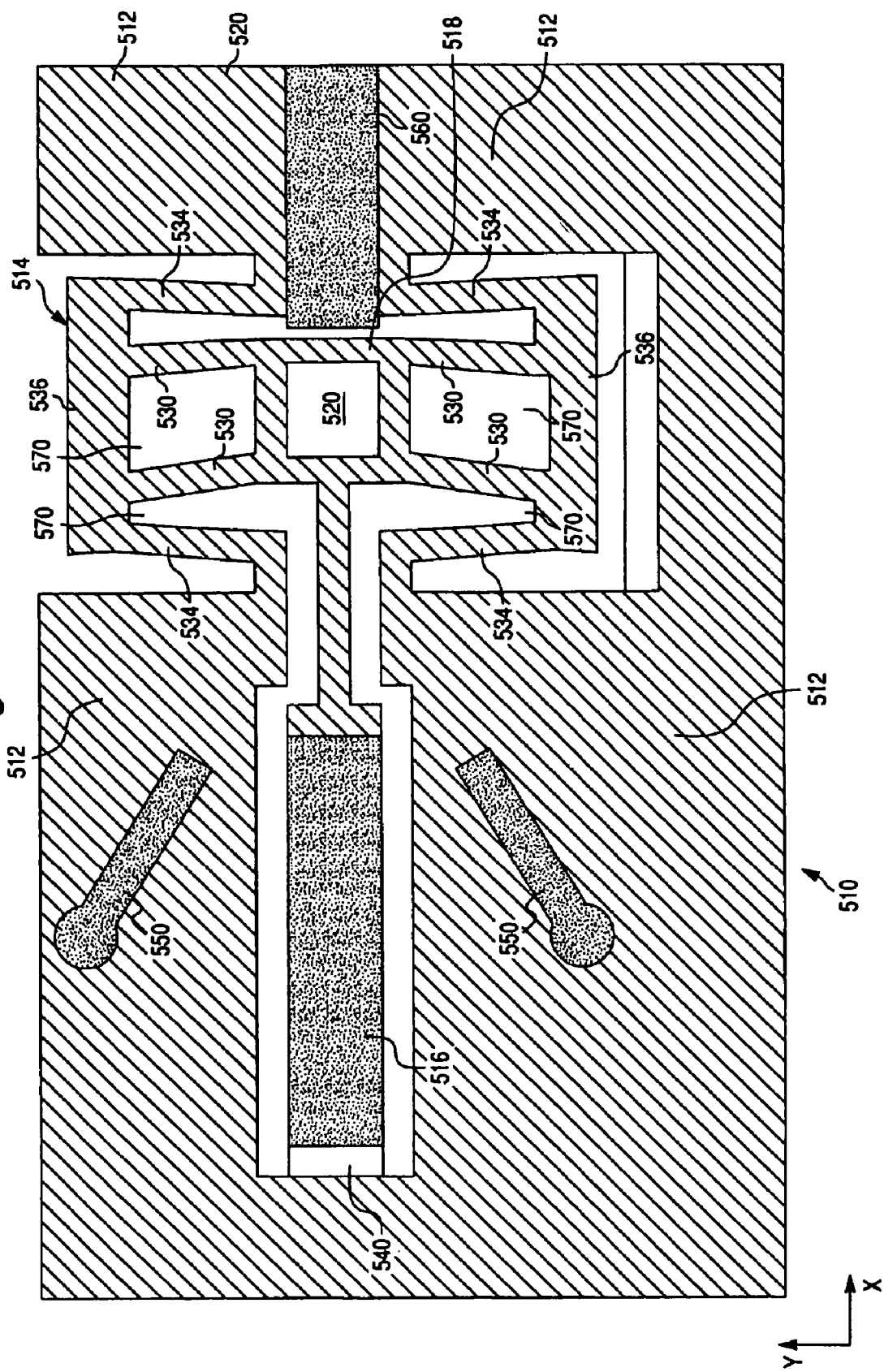
FIG. 6 is a schematic view of the motion mechanism as illustrated in FIG. 5, where the transducer is providing a force on the flexure portion.

The flexing of the elongated portions 530 and 534 at their respective points of contact is illustrated in FIG. 6. FIG. 5 illustrates the motion mechanism 510 in the situation where the transducer 516 is not applying a force on the flexure portion 514, while FIG. 6 illustrates the motion mechanism 510 in the situation where the transducer 516 is applying a force on the flexure portion 514 to the right, or in the +x direction. As can be seen in FIG. 6, the elongated portions 530 and 534 flex at their contact points. FIG. 5 corresponds to the minimum travel state of the payload 520, while FIG. 6 corresponds to the maximum travel state of the payload 520 in the +x direction.

Returning to FIG. 5, the motion mechanism 5 10 may include a preloaded screw 540 that functions to provide a compressive force to the transducer 516. The transducer 516 provides a force to the payload support portion 518 at one end, while the opposing end of the transducer 516 contacts the preloaded screw. In the case that the transducer 516 comprises a piezoelectric stack, the compression force from the preloaded screw aids in preventing the piezoelectric stack from coming apart when no voltage is applied to the stack.

The preloaded screw 540 can be adjusted to provide compression as desired. While a larger compression aids in preventing the stack from breaking apart, it also reduces the maximum travel that can be provided to the payload 520.

Preferably the stiffness of the flexure portion 514 is comparable to the stiffness of the transducer 516. A comparable stiffness allows for a good repeatability in the motion of the payload 520 driven by the transducer 516, and provides a higher bandwidth performance. The range of the force of the transducer 516 may be adjusted by adjusting the compression force from the preload screw 540. The stiffness of the flexure portion 514 may be between ⅟₁₀ and 4 times the stiffness of the transducer 516, or between ⅟₁₀ and 2 times the stiffness of the transducer 516, for example. Preferably the stiffness of the flexure portion 514 is substantially the same as the stiffness of the transducer 516.

The base portion 512 and the flexure portion 514 may be formed from the same block of material. In this way the base portion 512 and the flexure portion 514 may be integral. For example, the base portion 512 and the flexure portion 514 may be formed from a titanium alloy, aluminum alloy or steel block. The block may be machined to form the base portion 512 and the flexure portion 514 in an integral fashion.

The base portion 512 may comprise a ground block, and the ground block may include one or more spray nozzles 550 thereon to provide a spray towards the payload support portion 518. For example, if the payload 520 is a cutting tool, the spray nozzles 550 may provide a spray of air or other gas to blow away chips or other debris formed when the cutting tool cuts into a workpiece.

The motion mechanism 10 may also include a position probe 560 to detect the position of the payload support portion 518. The position probe 560 provides feedback when the motion mechanism 510 is controlled to position the payload support portion 518 and its payload 520. The position probe 560 may be at least one of a capacitance gauge, a laser range finder, or an interferometer, for example.

The motion mechanisms 510 may also include a constrained layer 570 that acts to provide viscoelastic damping to the motion of the payload support portion 518 and thus the payload 520. This damping reduces overshoot and ringing in the actual position of the payload 520 relative to the commanded position of the payload when the payload 520 is driven. The constrained layer 570 may be positioned to fill the regions between the payload support portion 518, the elongated portions 530 and 534, and the base portion 512. The constrained layer 570 may comprise a viscoelastic material such as polypropylene, for example.

Figure 7:
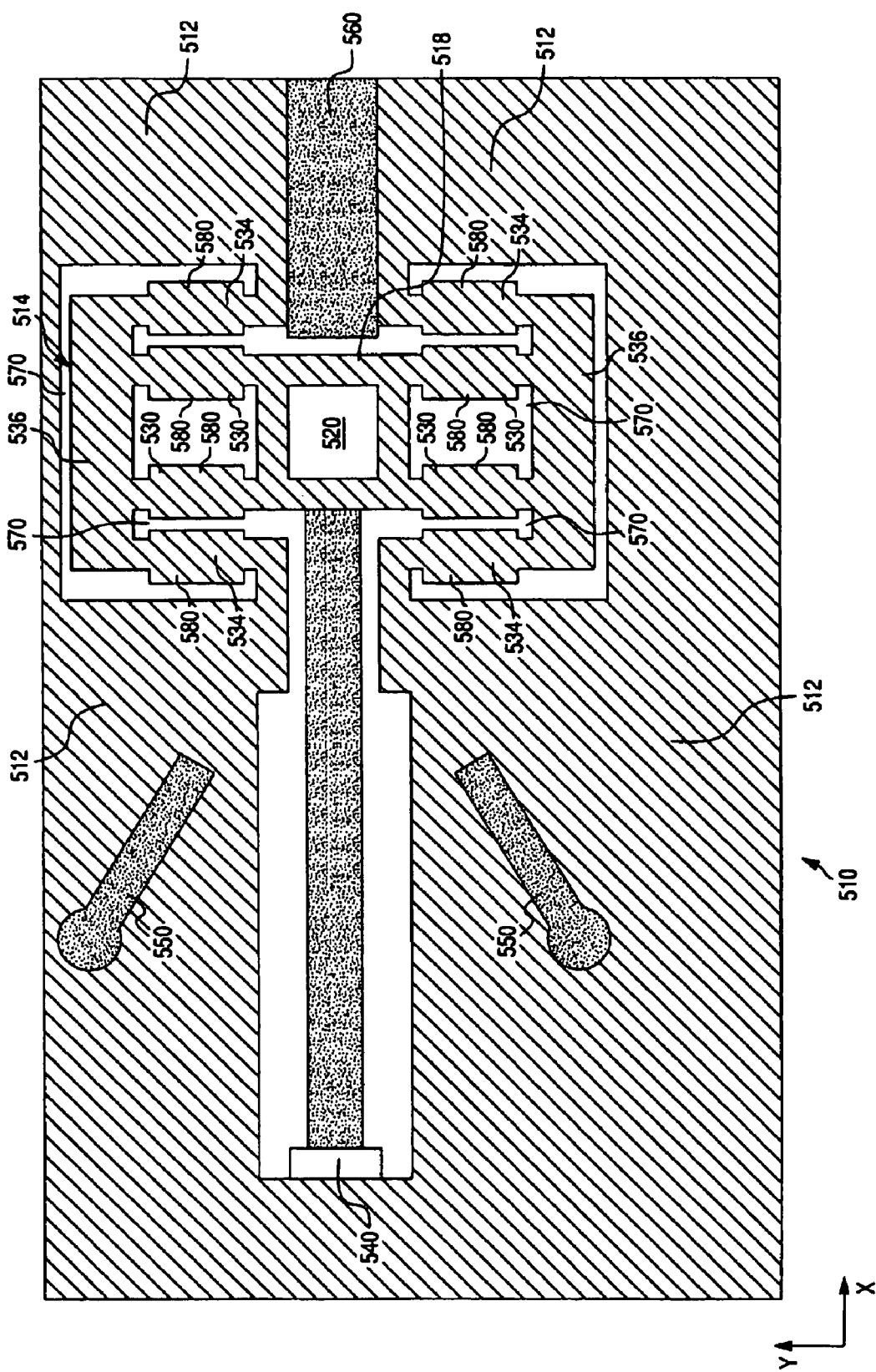
FIG. 7 is a schematic view of a motion mechanism according to yet another preferred embodiment of the invention.

FIG. 7 illustrates an embodiment similar to that shown in FIG. 5. In the embodiment of FIG. 7, however, the thickness of each of the elongated portions 530 and 534 has a middle portion 580 which is stiffer than its end portions. This may be accomplished, for example, by having the middle portions 580 be thicker than the end portions, or by providing that the middle portions are formed of a material which has a higher stiffness than the material of the end portions. In this embodiment the rotational stiffness of the flexure 514 is increased.

Figure 4:
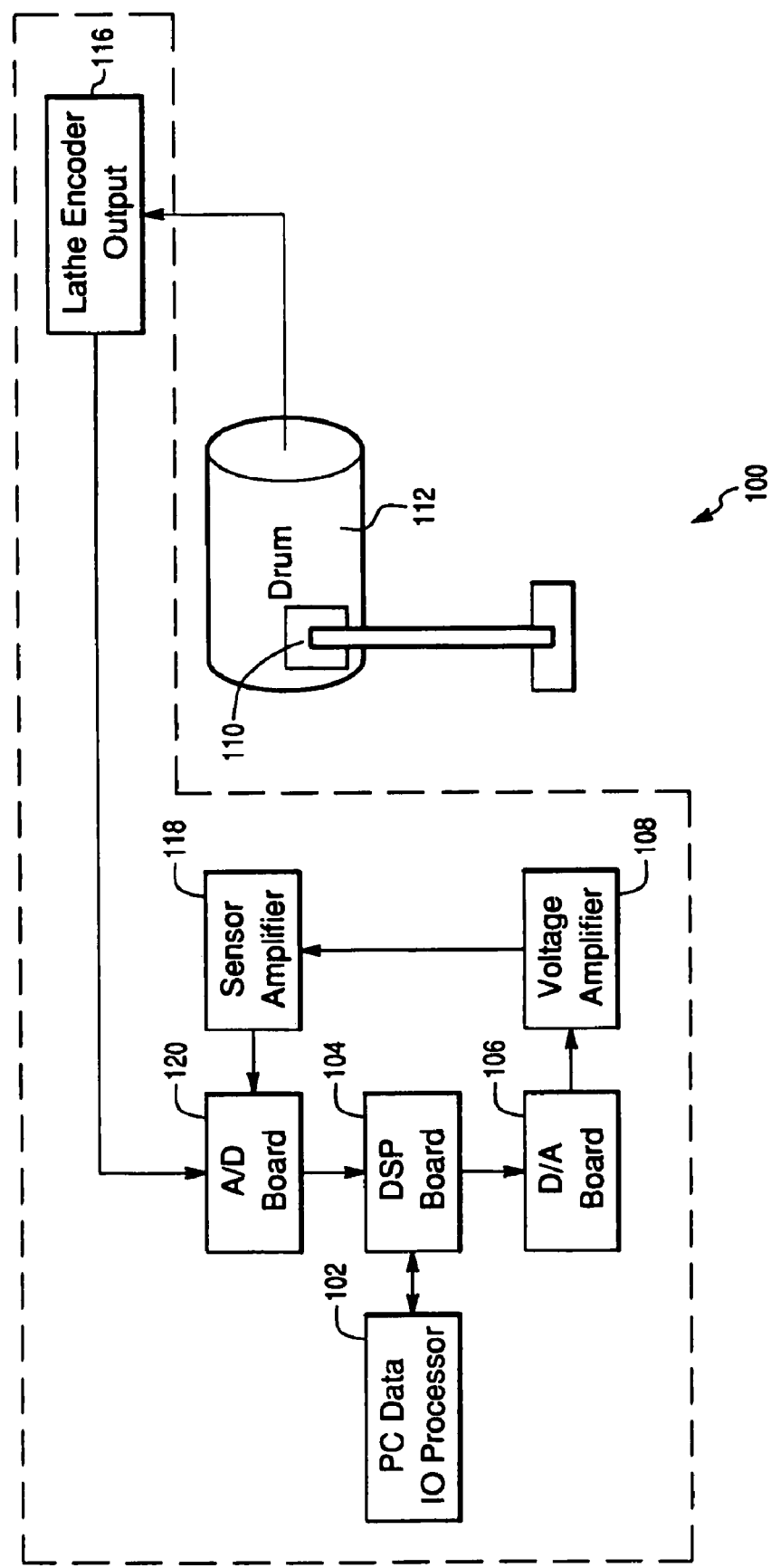
FIG. 4 is a schematic of a machine tool system according to an embodiment of the invention.

FIG. 4 illustrates a machine tool system 100 according to an embodiment of the invention which employs a motion mechanism 110, which may be the motion mechanism 10 with a cutting tool as the payload 20 as described above in FIGS. 1-3, or the motion mechanism 510 with a cutting tool as the payload 520 as described above in FIGS. 5-7. The machine tool system 100 provides for the machining of a workpiece (not shown) provided on a workpiece support 112 such as a rotating drum. The machine tool system includes a controller unit 114 that controls the transducers 40 and 42 (or just 40 in the embodiment of FIG. 3 (see FIGS. 1-3) of the motion mechanism 10, or just 516 in the embodiments of FIGS. 5-7), and receives feedback from the position probe 60 or 560 of the motion mechanism 10 or 510. An input/output data processor 102 provides cutting commands to a digital signal processing (DSP) unit 104 that supplies a signal to a digital-to-analog (DA) conversion device 106. Voltage amplifier 108 receives a signal from the DA converter 106 and drives the transducer of the motion mechanism 10 or 510 to direct the motion of cutting tool payload 20 (see FIGS. 1-3 or 5-7). The position probe 60 (see FIGS. 1-3) or 560 (see FIGS. 5-7) senses a position of the payload and provides a signal indicative of the position to a sensor amplifier 118. Amplifier 118 amplifies the signal. The amplified signal is directed to analog-to-digital (A/D) converter 120. Lathe encoder 116 determines the position of the workpiece on the workpiece support 112 and provides a feedback signal to the A/D converter 120. The A/D converter 120 thus provides a feedback signal indicative of the position of the cutting tool and the position of the workpiece on the workpiece support 112 as output to the digital signal processing unit 104. The DSP unit 104 provides a processed signal to the input/output processor 102. The payload 20 may be driven as desired. The machine tool system may provide motion in addition to the motion mechanism 110. When machining, the additional motion may be provided in a direction, defined as the cutting direction, in the nominal plane of the surface of the workpiece. Additional motion in a direction, defined as the in-feed direction, in and out of the nominal plane of the surface of the workpiece may also be provided. The motion mechanism 110 may be used to provide motion in the cutting direction, in the plane of the surface orthogonal to the cutting direction, in the in-feed direction, or any combination thereof.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A motion mechanism comprising:
   a base portion;
   a flexure portion comprising:
      a payload support portion configured to support a payload;
      a first plurality of elongated portions extending substantially in a first direction and contacting the payload support portion; and
      wherein the flexure portion contacts the base portion; and
   a transducer arranged to provide a force to the payload support portion in a second direction when actuated, the second direction substantially orthogonal to the first direction.

2. The motion mechanism of claim 1, wherein the flexure portion further comprises:

at least one bar portion contacting respective of the first plurality of elongated portions at an end of the respective first plurality of elongated portions opposite to an end contacting the payload support portion; and a second plurality of elongated portions extending substantially in the first direction, each elongated portion of the second plurality of elongated portions having a first end and an opposing second end, the first end contacting the base portion via a respective contact point and the opposing end contacting a respective at least one bar portion.

3. The motion mechanism of claim 2, wherein each of the elongated portions has a middle portion which is stiffer than its end portions.

4. The motion mechanism of claim 2, wherein the transducer provides the force to the payload support portion via a first transducer end, the mechanism further comprising:

a preloaded screw contacting and providing a compression force to a second transducer end opposite the first transducer end.

5. The motion mechanism of claim 1, wherein the stiffness of the flexure portion is substantially the same as the stiffness of the transducer.

6. The motion mechanism of claim 1, wherein the base portion and flexure portion are of the same material.

7. The motion mechanism of claim 6, wherein the base portion and flexure portion comprise at least one of titanium alloy, aluminum alloy, or steel.

8. The motion mechanism of claim 1, wherein the base portion comprise a ground block, and the mechanism further comprises:

at least one spray nozzle arranged on the ground block to provide a spray towards the payload support portion.

9. The motion mechanism of claim 1, further comprising:

a position probe arranged to detect the position of the payload support portion.

10. The motion mechanism of claim 9, wherein the position probe is at least one of a capacitance gauge, a laser range finder, or an interferometer.

11. The motion mechanism of claim 1, further comprising:

a payload attached to the payload support portion, wherein the payload comprises at least one of a cutting tool or a laser head.

12. The motion mechanism of claim 11, wherein the payload comprises a diamond cutting tool.

13. The motion mechanism of claim 1, wherein the transducer comprises a piezoelectric stack.

14. The motion mechanism of claim 1, wherein the resonant frequency of motion of the payload support portion is greater than about 4 kHz.

15. The motion mechanism of claim 1, wherein the stiffness of the flexure portion is between 0.1 and 4 times the stiffness of the transducer.

16. The motion mechanism of claim 15, wherein the stiffness of the flexure portion is between 0.1 and 2 times the stiffness of the transducer.

17. A motion control system comprising:

a workpiece support configured to support a workpiece;

a motion mechanism comprising:

a base portion;

a flexure portion comprising:

a payload support portion configured to support a payload;

a first plurality of elongated portions extending substantially in a first direction and contacting the payload support portion, wherein the flexure portion contacts the base portion; and a transducer arranged to provide a force to the payload support portion in a second direction when actuated, the second direction substantially orthogonal to the first direction; and a controller unit configured to control the transducers to control the motion of the cutting tool to cut the workpiece.

18. The motion control system of claim 17, wherein the controller is further configured to control the motion mechanism to provide motion in a direction in a plane of a surface of the workpiece and in a direction perpendicular to the plane of the surface of the workpiece.

* * * * *